(12) United States Patent
Lee

(10) Patent No.: US 12,585,074 B2
(45) **Date of Patent: *Mar. 24, 2026**

---

(54) OPTICAL CABLE

(71) Applicant: LS CABLE & SYSTEM LTD.,
Anyang-si (KR)

(72) Inventor: Man Su Lee, Chilgok-gun (KR)

(73) Assignee: LS CABLE & SYSTEM LTD.,
Anyang-si (KR)

( * ) Notice: Subject to any disclaimer, the term of this
patent is extended or adjusted under 35
U.S.C. 154(b) by 0 days.

This patent is subject to a terminal dis-
claimer.

(21) Appl. No.: 18/816,008

(22) Filed: Aug. 27, 2024

(65) Prior Publication Data

US 2024/0418954 A1 Dec. 19, 2024

Related U.S. Application Data

(63) Continuation-in-part of application No. 18/288,975,
filed as application No. PCT/KR2022/001031 on Jan.
20, 2022, now Pat. No. 12,105,336.

(30) Foreign Application Priority Data

Jun. 24, 2021 (KR) ......................... 10-2021-0082674
Jul. 5, 2021 (KR) ......................... 10-2021-0087588

(51) Int. Cl.
*G02B 6/44* (2006.01)

(52) U.S. Cl.
CPC ......... *G02B 6/4433* (2013.01); *G02B 6/4434*
(2013.01); *G02B 6/448* (2013.01); *G02B*
*6/4486* (2013.01); *G02B 6/449* (2013.01)

(58) Field of Classification Search
CPC ... G02B 6/4433; G02B 6/4434; G02B 6/4486
See application file for complete search history.

(56) References Cited

U.S. PATENT DOCUMENTS

| | | |
|---|---|---|
| 4,836,640 A | 6/1989 | Gartside et al. |
| 2010/0135625 A1 | 6/2010 | Overton |

(Continued)

FOREIGN PATENT DOCUMENTS

| | | |
|---|---|---|
| CA | 2027140 | 10/1990 |
| EP | 0485107 A2 | 5/1992 |
| EP | 0485107 A3 | 5/1992 |

(Continued)

OTHER PUBLICATIONS

International Search Report for related International Application
No. PCT/KR2022/001031; action dated Dec. 29, 2022; (2 pages).

(Continued)

*Primary Examiner* — Uyen Chau N Le
*Assistant Examiner* — Hoang Q Tran
(74) *Attorney, Agent, or Firm* — K&L Gates LLP

(57) ABSTRACT

The present disclosure relates to an optical cable in which an
optical fiber bundle with clustered or bundled optical fibers
is accommodated in a tubular member and the optical fibers
are formed in an excess group length (EGL) by modeling
considering bending properties of the optical cable or a
lossless bending radius of the optical fibers of the optical
fiber bundle, thereby minimizing stress, damage or optical
loss of the optical fibers in the optical fiber bundle.

16 Claims, 4 Drawing Sheets

(56) References Cited

U.S. PATENT DOCUMENTS

| | | | | |
|---|---|---|---|---|
| 2020/0217750 A1* | 7/2020 | Floris | .................. | G01M 11/088 |
| 2022/0373759 A1* | 11/2022 | Toland | ................ | G02B 6/4494 |

FOREIGN PATENT DOCUMENTS

| | | | |
|---|---|---|---|
| EP | 3282295 | A1 | 2/2018 |
| EP | 3796060 | B1 | 12/2022 |
| KR | 1019880000810 | A | 3/1988 |
| KR | 20030068735 | A | 8/2003 |
| KR | 20120025163 | A | 3/2012 |
| KR | 20120081817 | A | 7/2012 |
| KR | 101389592 | B1 | 5/2014 |
| KR | 20160092667 | A | 8/2016 |
| KR | 20200090006 | A | 7/2020 |

OTHER PUBLICATIONS

Written Opinion for related International Application No. PCT/KR2022/001031; action dated Dec. 29, 2022; (2 pages).
Korean Office Action for related Korean Application No. 10-2021-0087588; action dated Mar. 20, 2023; (15 pages).
Office Action for related Canadian Application No. 3,208,916; action dated Sep. 28, 2023; (7 pages).
"CBO GmBHm, G652D vs. G657A2—What is the Difference?"; Apr. 8, 2020; https://www.cbo-it.de/en/blog/fiber-patch-cable/g652d-vs-g657a2-whats-the-difference.html; (8 pages).
Extended European Search Report for related European Application No. 22828559.9; action dated Feb. 27, 2025; (10 pages).

\* cited by examiner

OPTICAL CABLE

CROSS-REFERENCE TO RELATED APPLICATIONS

The present disclosure is a Continuation-in-Part of U.S. application Ser. No. 18/288,975, filed Oct. 30, 2023, which is a Patent Cooperation Treaty National Stage entry claiming benefit to application PCT/KR2022/001031 having a filing date of Jan. 20, 2022, which claims priority to Korean Application No. 10-2021-0082674, filed Jun. 24, 2021 and Korean Application No. 10-2021-0087588, filed on Jul. 5, 2021, each of which is incorporated herein in its entirety.

FIELD

The present disclosure relates to an optical cable. The present disclosure relates to an optical cable in which an optical fiber bundle with clustered or bundled optical fibers is accommodated in a tubular member and the optical fibers are formed in an excess group length (EGL) by modeling considering bending properties of the optical cable or a lossless bending radius of the optical fibers of the optical fiber bundle, thereby minimizing stress, damage or optical loss of the optical fibers in the optical fiber bundle.

BACKGROUND

With an increase in communication services such as Fiber to the Home (FTTH), 4G, and 5G, the demand for optical communication is increasing, and the application of multi-fiber optical cables is increasing to build a large-capacity optical communication network using a limited conduit for laying an optical cable.

FIG. 1 is a cross-sectional view of an example of an optical cable with a plurality of tubular members 20 accommodating a plurality of general optical fibers 11 therein. FIG. 2 is a cross-sectional view of another example of an optical cable with a tubular member 20' accommodating a plurality of optical fibers 11 therein.

As shown in FIGS. 1 and 2, a large-capacity multi-fiber optical cable may include a plurality of optical units 15 and 15' in which a plurality of optical fibers 11 are accommodated in tubular members 20 and 20'. The optical units 15 and the optical units 15' may be included in a cable jacket 50, and arranged around a central tensile member 30 in a circumferential direction as shown in FIGS. 1 and 2, but the central tensile member 30 may be omitted.

The central tensile member 30 may include a core 31 formed of a reinforced glass fiber and a coating layer 33 surrounding the core 31.

The optical units 15 and 15' may include the tubular members 20 and 20' and the plurality of optical fibers 11 included in the tubular members 20 and 20'. Each of the optical units 15 and 15' may include several hundreds of optical fibers. The plurality of optical fibers of each of the optical units 15 and 15' may form a bunch of clustered or bundled optical fibers (hereinafter, referred to as a "bundle 10").

The plurality of optical units 15 and 15' may be gathered by a binding tape 40 and covered with the cable jacket 50 to provide a large-capacity optical cable.

Here, the tubular member 20 of the optical cable shown in FIG. 1 may be formed of a relatively hard material to a sufficient thickness to protect the optical fibers, thus maintaining a round shape of the tubular member 20. The tubular member 20' of the optical cable shown in FIG. 2 may be formed of a relatively soft material to increase a space factor in the optical cable and easily cut the tubular member 20' for connection work or the like. Therefore, the shape of the tubular member 20' of the optical cable shown in FIG. 2 may be changed to a trapezoidal or fan shape in the cable jacket 50, thereby reducing an empty space inside the optical cable.

When the optical units 15 and 15' include an optical fiber bundle 10 of a plurality of optical fibers 11 and the tubular member 20 and 20', the optical fiber bundle 10 is not arranged in a straight line inside the tubular members 20 and 20' but is provided to be greater than or equal to, in length, the tubular members 20 and 20' and arranged in a spiral or curved form inside the tubular members 20 and 20' to secure bending properties and prevent damage to the optical fibers 11. Due to the above structure, excellent bending properties and optical signal transmission characteristics of the optical cable can be secured.

In this case, even when the optical fiber bundles 15 and 15' are formed to be longer than the tubular member, the bending properties of the optical fibers may deteriorate or the optical fibers may be damaged due to the absence of a buffer area of the optical fibers, when an excess group length (EGL) of the optical fiber bundles 15 and 15' are shorter than an appropriate EGL and a tensile force is applied to the optical cable or the optical cable is bent (curved).

This is because when the EGL of the optical fiber bundle is shorter than the appropriate EGL, bending stress is directly applied to the optical fibers of the optical fiber bundle when the optical cable is curved or bent, and a tensile force applied to the optical cable is directly transmitted to the optical fibers during the laying of the optical cable.

On the contrary, when the EGL of the optical fiber bundle is greater than the appropriate EGL, the optical fiber bundle may be excessively pressurized and accommodated in the tubular member of the optical unit and therefore stress may be applied to the optical fibers, thus causing the deterioration of optical communication characteristics.

Accordingly, an optical fiber bundle is required to have an EGL relative to the length of a tubular member of an optical cable and thus should be set to be in an appropriate range of EGL.

SUMMARY

The present disclosure is directed to providing an optical cable in which an optical fiber bundle with clustered or bundled optical fibers is accommodated in a tubular member and the optical fibers are formed in an optimal excess group length (EGL) by modeling considering bending properties of the optical cable or a lossless bending radius of the optical fibers of the optical fiber bundle, thereby minimizing stress, damage or optical loss of the optical fibers in the optical fiber bundle.

To achieve these objects, the present disclosure provides an optical cable comprising: a plurality of optical fibers; and a tubular member configured to accommodate therein an optical fiber bundle formed by gathering the plurality of optical fibers, wherein a length of the optical fibers of the optical fiber bundle is greater than or equal to a length of the tubular member, and a ratio ($\varepsilon$) of an excess group length of the optical fibers of the optical fiber bundle to the length of the tubular member of the optical cable satisfies the following formula:

$$\varepsilon \leq \sqrt{\frac{2R}{2R-H}} - 1,$$

wherein R denotes a lossless bending radius of the optical fibers, and H denotes a diameter based on a cross-sectional area of the optical cable with a spiral trajectory of a center point on the optical fiber bundle modeled as having a circular cross-section.

And the optical cable may further comprise a jacket configured to cover the tubular member.

And when the optical fiber bundle includes a plurality of types of optical fibers, a lossless bending radius of the plurality of types of optical fibers may be largest among lossless bending radii of the plurality of types of optical fibers.

And the plurality of optical fibers of the optical fiber bundle may comprise at least one rollable optical fiber ribbon.

And two or more tubular members may be provided.

And the optical cable may further comprise a central tensile member, an outer circumferential surface of which is surrounded by the plurality of tubular members in contact with the plurality of tubular members.

And the optical cable may further comprise a binding member configured to bind the plurality of tubular members, wherein the binding member is provided between the plurality of tubular members and the jacket.

And optical fibers may comprise at least one of G.652 optical fibers, G.657.A1 optical fibers, G.657.A2 optical fiber, or G.657.B3 optical fibers.

And R may be 40 mm when the type of the optical cable including the rollable optical fiber ribbons is G.652, may be 30 mm when the type of the optical cable is G.657.A1, may be 25 mm when the type of the optical cable is G.657.A2, and may be 20 mm when the type of the optical cable is G.657.B3.

And to achieve these objects, the present disclosure provides an optical cable comprising: a central tensile member; a plurality of optical fiber bundles formed by gathering a plurality of optical fibers; a plurality of tubular members arranged around the central tensile member and accommodating the plurality of optical fiber bundles therein; and a jacket covering the plurality of tubular members, wherein a ratio (ε) of an excess group length of the rollable optical fiber ribbons of the optical fiber bundles to a length of the tubular members of the optical cable satisfies the following formula:

$$0 \le \varepsilon \le \sqrt{\frac{2R}{2R-H}} - 1,$$

wherein R denotes a lossless bending radius of the optical fibers, and H denotes a diameter based on a cross-sectional area of the optical cable with a spiral trajectory of a center point on the optical fiber bundle modeled as having a circular cross section.

And optical fibers may comprise at least one of G.652 optical fibers, G.657.A1 optical fibers, G.657.A2 optical fiber, or G.657.B3 optical fibers.

And the plurality of optical fibers of the optical fiber bundle may comprise at least one rollable optical fiber ribbon.

And R may be 40 mm when the type of the optical cable including the rollable optical fiber ribbons is G.652, may be 30 mm when the type of the optical cable is G.657.A1, may be 25 mm when the type of the optical cable is G.657.A2, and may be 20 mm when the type of the optical cable is G.657.B3.

And to achieve these objects, the present disclosure provides a manufacturing method of a multi-fiber optical cable, comprising: forming an optical fiber bundle by gathering a plurality of optical fibers; forming a tubular member by a first extrusion molding device to surround the optical fiber bundle; forming an optical unit assembly by gathering a plurality of tubular members by a gathering device while twisting the plurality of tubular members around a central tensile wire, and binding the plurality of tubular members by a binding member; and forming a jacket by a second extrusion molding device to cover the optical unit assembly, wherein, when in the forming of the tubular member, an insertion rate of the optical fiber bundle is V1 and an extrusion rate of the tubular member is V2, the following formula is satisfied:

$$1 \le \frac{V1}{V2} \le \sqrt{\frac{2R}{2R-H}},$$

wherein R denotes a lossless bending radius of the optical fibers, and H denotes a diameter based on a cross-sectional area of the optical cable with a spiral trajectory of a center point on the optical fiber bundle modeled as having a circular cross section.

And the plurality of optical fibers of the optical fiber bundle comprise at least one rollable optical fiber ribbon.

And the gathering device may gather the plurality of tubular members while repeatedly twisting the plurality of tubular members around a central tensile wire in a sz-direction.

According to an optical cable of the present disclosure, a range of an excess group length (EGL) of an optical fiber bundle for securing good optical communication characteristics can be determined by a bending radius of the optical fiber bundle derived by three-dimensional (3D) space modeling of an optical fiber bundle arranged spirally on an inner circumferential surface of a tubular member.

According to the optical cable of the present disclosure, a range of optimal EGL of the optical fiber bundle can be determined according to the type of optical fibers of the optical fiber bundle.

In addition, according to the optical cable of the present disclosure, a length of the optical fiber bundle inside the tubular member relative to the length of the tubular member of the optical cable is set to be in an appropriate range, thereby securing good bending properties and tensile properties of the optical cable.

DETAILED DESCRIPTION

Hereinafter, embodiments of the present disclosure will be described in detail with reference to the accompanying drawings. The present disclosure is, however, not limited thereto and may be embodied in many different forms. Rather, the embodiments set forth herein are provided so that this disclosure will be thorough and complete, and fully convey the scope of the disclosure to those of ordinary skill in the art. Throughout the specification, the same reference numbers represent the same elements.

Figures 3, 4:
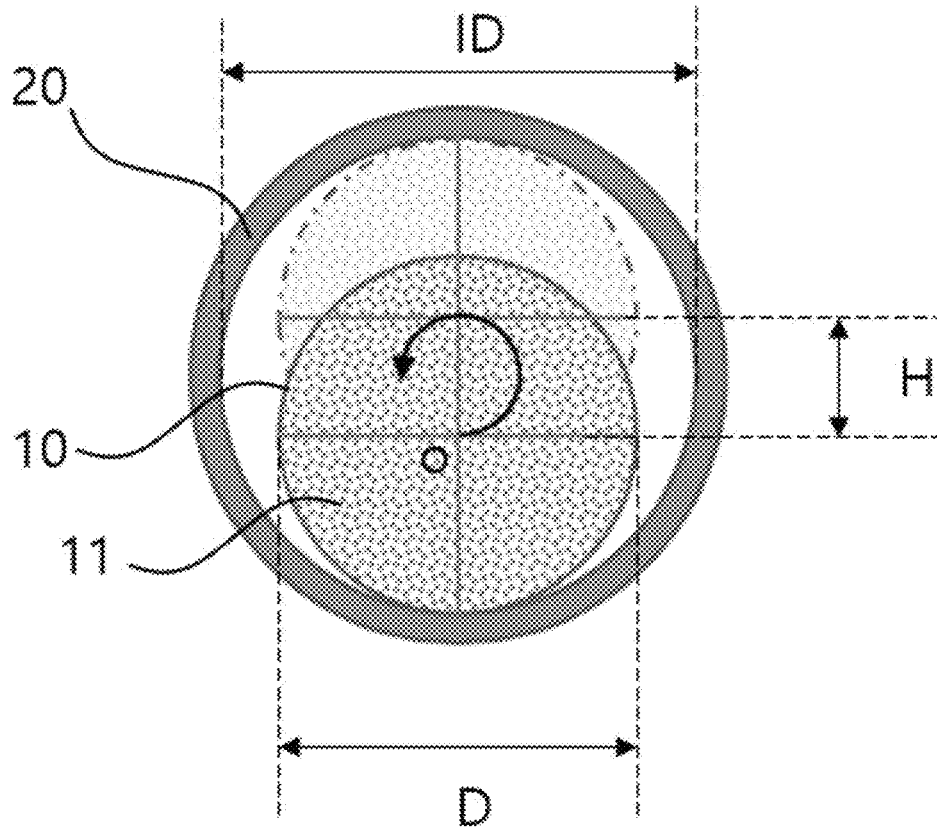
FIG. 3 illustrates a method of deriving an outer diameter of an optical fiber bundle according to the present disclosure.
FIG. 4 is a cross-sectional view of an example of an optical cable according to the present disclosure.
Figure 5:
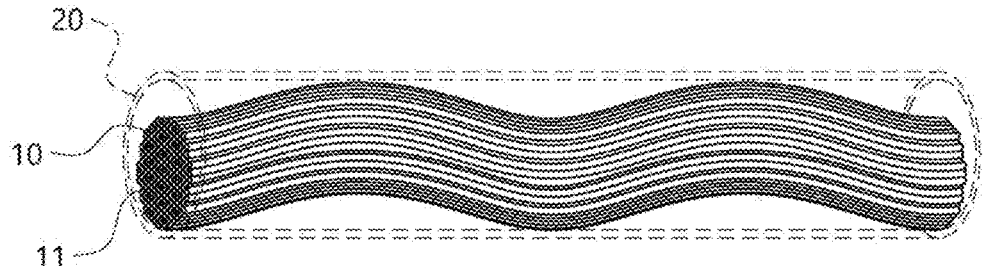
FIG. 5 is a perspective view of the optical cable of FIG. 3.

FIG. 3 illustrates a method of deriving an outer diameter of an optical fiber bundle according to the present disclosure. FIG. 4 is a cross-sectional view of an example of an optical cable according to the present disclosure. FIG. 5 is a perspective view of the optical cable of FIG. 3.

In the present disclosure, an optical fiber bundle 10 in which a plurality of optical fibers 11 or optical fiber ribbons are gathered are accommodated in a tubular member to form a large-capacity multi-fiber optical cable 100. The plurality of optical fibers 11 may be bundled or gathered in a bundle to form the optical fiber bundle 10. Here, the optical fiber bundle 10 may be a set of rollable optical fiber ribbons that are rollable in a width direction thereof by forming a connection part, which connects a plurality of optical fibers in the form of ribbons, in a flexible structure or using a flexible material. More specifically, the rollable optical fiber ribbons may be configured to be rolled up in the width direction by intermittently forming the connection part between optical fibers or forming a coupling part on a surface of each of a plurality of optical fibers in an unbalanced manner.

The optical fiber bundle 10 described above is accommodated in the tubular member 20, and may be arranged or laid in the tubular member 20 in a curved or spiral form rather than a linear form to secure bending properties of the optical cable 100 and prevent stress or optical loss of the optical fibers. The optical fiber bundle 10 may be configured by gathering a plurality of optical fibers or optical fiber ribbons.

In this case, the plurality of optical fibers of the optical fiber bundle 10 comprise at least one rollable optical fiber ribbon.

A range of optimal EGL of the optical fiber bundle 10 accommodated in the tubular member 20 may be determined by a laying trajectory of the optical fiber bundle 10 in the tubular member 20 and thus is deduced by modeling a form in which an optical fiber bundle is laid in a tubular member with an inner diameter greater than an outer diameter of the optical fiber bundle.

In this case, an EGL of the optical fiber bundle may be largest when the optical fiber bundle is spirally laid in the tubular member and thus modeling is performed based on an assumption that the optical fiber bundle is spirally arranged inside the tubular member.

As shown in FIG. 3, when n optical fibers each having an outer diameter d are gathered to form an optical fiber bundle, an outer diameter D of the optical fiber bundle may be deduced in a manner as shown in FIG. 3.

That is, when the optical fiber bundle 10 includes n individual optical fibers each having an outer diameter d, an area of n squares, the length of each side of which is d may be simplified to $nd^2$, and when an optical fiber bundle is formed in a round shape having an outer diameter D, it may be determined that an area, i.e., $\pi D^2/4$, of a round optical fiber bundle is equal to an area of the n optical fibers.

Thus, the outer diameter D of the optical fiber bundle 10 may be simplified by Formula 1 below. That is, Formula 1 below may be derived by modeling that an optical fiber bundle is in a circular form and the area of $\pi D^2/4$ is equal to the sum of the areas of n squares, the length of each side of which is d.

$$D = 2d\sqrt{\frac{n}{\pi}} \qquad \text{Formula (1)}$$

As described above, the diameter D of the optical fiber bundle 10 is derived from the diameter d of each of the optical fibers 11 and the total number n of the optical fibers 11 of the optical fiber bundle 10, and modeling is performed on an assumption that the optical fiber bundle 10 is laid in the tubular member 20 with an inner diameter ID as shown in FIGS. 4 and 5.

It may be assumed that a spiral laying trajectory of the optical fiber bundle 10 inside the tubular member 20 shown in FIGS. 4 and 5 may follow a spiral laying trajectory of a center point on a cross section of the optical fiber bundle 10 as indicated by a circular arrow in FIG. 4. In this case, a diameter of a spiral laying trajectory (hereinafter referred to as a "spiral diameter") with respect to the cross section of the optical fiber bundle 10 may be denoted by H as shown in FIG. 4. In this case, the spiral diameter may be equal to the difference, i.e., ID-D, between an inner diameter of the tubular member 20 and an outer diameter of the optical fiber bundle 10.

When the optical fiber bundle 10 is spirally arranged inside the tubular member 20, the length of the optical fiber bundle 10 should be greater than or equal to that of the tubular member 20. However, when bending properties of the optical fiber bundle 100 or a tensile force applied to optical fibers among characteristics that should be considered to determine an optimal range are taken into account, the longer the EGL of the optical fiber bundle 10, the better but a bending radius of the spiral laying trajectory in the tubular member 20 decreases as the EGL of the optical fiber bundle 10 increases.

Even when the bending radius of the spiral laying trajectory of the optical fiber bundle 10 in the tubular member 20 decreases, optical loss and stress may be caused when the bending radius is less than a minimum bending radius (MBR) of each of optical fibers of the optical fiber bundle 10. Therefore, the bending radius of the spiral laying trajectory in the tubular member 20 should not be less than the minimum bending radius R_min.

The bending radius of the spiral laying trajectory of the optical fiber bundle 10 will be described with reference to FIG. 6 below.

Figure 6:
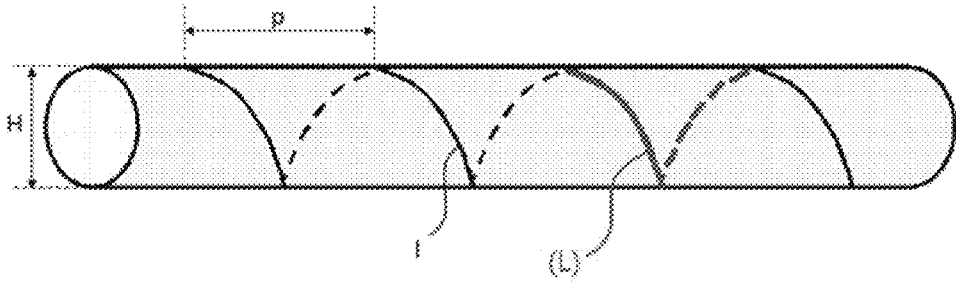
FIG. 6 illustrates a spiral laying trajectory (1) of a center point on an optical fiber according to the present disclosure during modeling of an optical fiber bundle spirally laid inside a tubular member.

FIG. 6 illustrates a spiral laying trajectory 1 of a center point on an optical fiber bundle 10 according to the present disclosure when the optical fiber bundle 10 is spirally laid inside a tubular member 20.

In FIG. 6, a spiral diameter of a spiral laying trajectory 1 of a center point on an optical fiber may be denoted by H as described above, and a period or pitch of the spiral laying trajectory l of the center point on the optical fiber may be denoted by p.

In this case, the bending radius of the spiral laying trajectory of the optical fiber bundle may be derived as expressed in Formula 2 below by applying a vector function widely used to derive a bending radius of a spiral trajectory on a cylinder.

$$R = \frac{p^2}{2\pi^2 H} + \frac{H}{2} \qquad \text{Formula 2}$$

A length L of an one-period arc of the spiral laying trajectory 1 may be simplified by Formula 3 below.

According to Formula 3 below, the length L of the one-period arc of the spiral laying trajectory 1 may be derived from a period p of the spiral laying trajectory 1 and the length of a longer side of a right triangle composed of a circumferential length πH of a cross section of a cylinder of FIG. 6.

$$L = \sqrt{(\pi H)^2 + p^2} \qquad \text{Formula 3}$$

A ratio ε of an EGL of the optical fiber bundle 10, which is spirally laid in the tubular member 20, in one period may be defined by Formula 4 below.

Here, the length of the tubular member 20 may correspond to the period p of the spiral laying trajectory 1, and a ratio ε of the EGL of the optical fiber bundle 10, which is spirally laid, in one period may be defined as a ratio of the period p of the spiral laying trajectory 1 to a deviation of the length L of the spiral laying trajectory 1 and the period p of the spiral laying trajectory 1.

$$\varepsilon = \frac{L - p}{p} = \frac{L}{p} - 1 \qquad \text{Formula 4}$$

Formula 1 above is converted into Formula 5 below to derive the period p of the spiral laying trajectory 1.

$$p = \pi \sqrt{H(2R - H)} \qquad \text{Formula 5}$$

When the length L of a one-period arc of the spiral laying trajectory 1 derived from Formula 3 and the period p of the spiral laying trajectory 1 derived from Formula 5 are sequentially substituted for Formula 4, the ratio ε of the EGL of the optical fiber bundle 10 in one period relative to the length of the tubular member 20 may be expressed by Formula 6 below. In Formula 5 below, the ratio ε of the EGL may be expressed by two variables, i.e., a bending radius R of the optical fiber bundle 10 and a spiral diameter H of the spiral laying trajectory 1.

Because the ratio ε of the EGL is proportional to a total range of the optical cable 100, an additionally required length of the optical fiber bundle 10 relative to the length of the tubular member 20 of the optical cable 100 may be determined.

$$\varepsilon = \sqrt{\frac{2R}{2R - H}} - 1 \qquad \text{Formula 6}$$

In the ratio ε of the EGL of the optical fiber bundle 10 of the optical cable 100 relative to the length of the tubular member 20, which is derived from Formula 6 above, the bending radius R of the optical fiber bundle 10 is derived from a 3D vector formula but may be limited to the minimum bending radius R_min of the optical fibers of the optical fiber bundle 10. Thus, the ratio ε of the EGL may be used as a reference value for determination of a maximum value of the EGL of the optical fiber bundle. That is, when the bending radius R of the optical fibers is equal to the minimum bending radius R_min, Formula 6 above should satisfy a relation of $$\varepsilon \leq \sqrt{\frac{2(R\_min)}{2(R\_min) - H}} - 1.$$

Thus, a maximum value of the ratio ε of the EGL of the optical fiber bundle 10 relative to the length of the tubular member 20 may be determined to be a value obtained by substituting the minimum bending radius R_min of the optical fibers of the optical fiber bundle 10 for the bending radius R of the optical fiber bundle 10.

In addition, according to the present disclosure, minimum bending radii R_min of various types of optical fibers that constitute an optical fiber bundle have been derived through an experiment described below.

An experiment for deriving a minimum bending radius was conducted by winding various types of optical fibers around a bobbin that decreases in diameter a predetermined number of times, inputting an optical signal with a specific intensity of optical power to one end of each of the optical fibers, measuring received optical power of the optical signal at the other end of each of the optical fibers, and deriving a minimum bending radius R_min (a half of the diameter of the bobbin), which is a minimum bending radius at which optical loss did not occur in each of the various types of optical fibers, according to a boundary value of the diameter of the bobbin at which an attenuation of the received optical power increased to a predetermined level or more.

Specifically, Table 1 below shows a result of winding fibers 1000 times around a bobbin whose diameter optical decreases in units of 5 mm, supplying an optical signal with a wavelength of 1625 nm at a specific optical power level to an end of each of the optical fibers from a light source, and deriving a minimum bending radius when the optical power level attenuated to 0.0001 dB. It may be determined that optical loss did not occur due to the bending of the optical fibers until the optical power level attenuated to 0.0001 dB and thus the minimum bending radius may be understood as a lossless bending radius.

TABLE 1

| Type of optical fiber | Minimum bending radius R-min (lossless bending radius) |
| --- | --- |
| G.652D | 40 mm |
| G.657A1 | 30 mm |
| G.657A2 | 25 mm |
| G.657B3 | 20 mm |

It may be concluded based on Table 1 above that according to the type of optical fibers of the rollable optical fiber ribbons or the optical fiber bundle, the minimum bending radius R_min is 40 mm when the optical fibers are G.652, is 30 mm when the optical fibers are G.657.A1, is 25 mm when the optical fibers are G.657.A2, and 20 mm when the optical fibers are G.657.B3.

Therefore, when an optical fiber bundle includes a type of optical fibers, one of the values shown in Table 1 above may be applied as the minimum bending radius R_min in Formula 6 for deriving an EGL of the optical fiber bundle.

When various types of optical fibers are used in combination, an EGL of an optical fiber bundle is preferably determined on the basis of a largest lossless bending radius.

Figure 1:
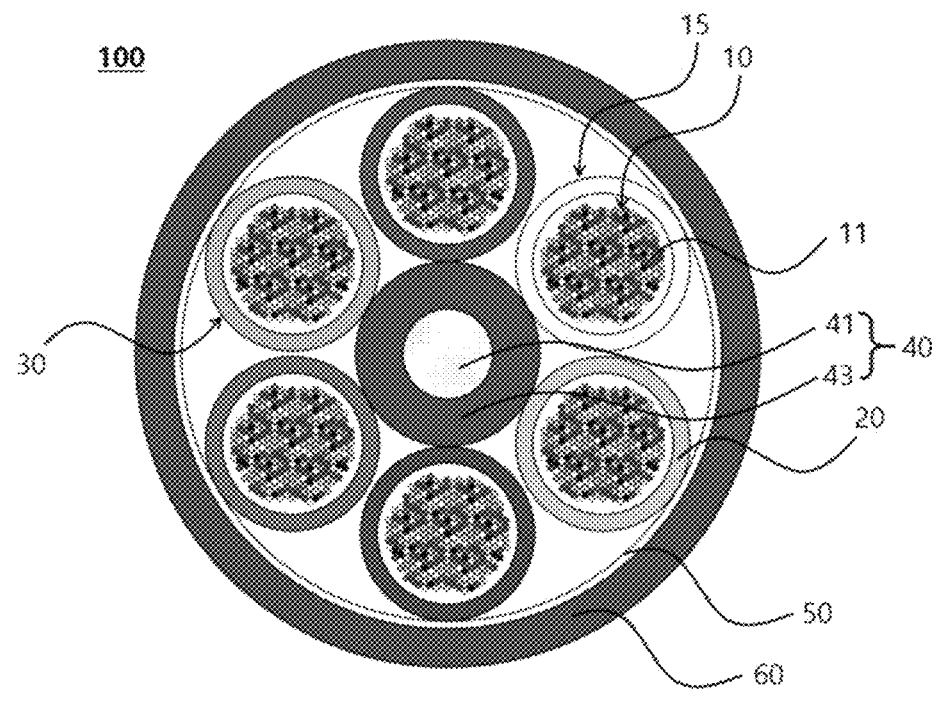
FIG. 1 is a cross-sectional view of an example of an optical cable with a tubular member accommodating a plurality of general optical fibers therein.

A spiral diameter H of a spiral laying trajectory L may be the difference between the inner diameter ID of the tubular member 20 of FIG. 1 and the outer diameter D of the optical fiber bundle 10 as described above.

$$H = ID - D \qquad \text{Formula 7}$$

Table 2 below shows an example in which a maximum value of a ratio ε of an EGL of an optical fiber bundle was derived from Formula 6 above when G652.D optical fiber with 288 cores was laid spirally in the tubular member 20 with an inner diameter of 5 mm.

The maximum value of the ratio ε of the EGL of the optical fiber bundle calculated by Formula 6 above is 0.073%. For example, when an optical cable is 1 km long, an additionally required length of the optical fiber bundle is in a range of 0 to 730 mm. In this case, when the EGL of the optical fiber bundle is greater than 730 mm, the minimum bending radius R_min of the optical fibers is limited, thus causing stress or optical loss of the optical fibers.

TABLE 2

| Variable | Definition | Actual measurement/ calculation result |
|---|---|---|
| R | Optical fiber | 40 mm |
| ID | Inner diameter of Tube | 5 mm |
| Df | Outer diameter of fiber | 0.255 mm |
| N | Number of optical fibers | 288 EA |
| D | Outer diameter of optical fiber bundle | 4.883054 mm |
| H | Spiral diameter | 0.116946 mm |
| p | Period of spiral trajectory of optical fiber bundle | 10.1855 mm |
| ε | Ratio of EGL of optical fiber bundle | 0.073% |

As described above, excellent bending properties, tensile properties, and optical communication characteristics of an optical cable can be secured by setting a length of an optical fiber bundle relative to the length of a tubular member of the optical cable to be in an appropriate range.

As described above, an optical cable as shown in FIGS. 1 and 2 can be manufactured by forming optical units in a length equal to a ratio of an EGL of an optical fiber bundle.

Figure 2:
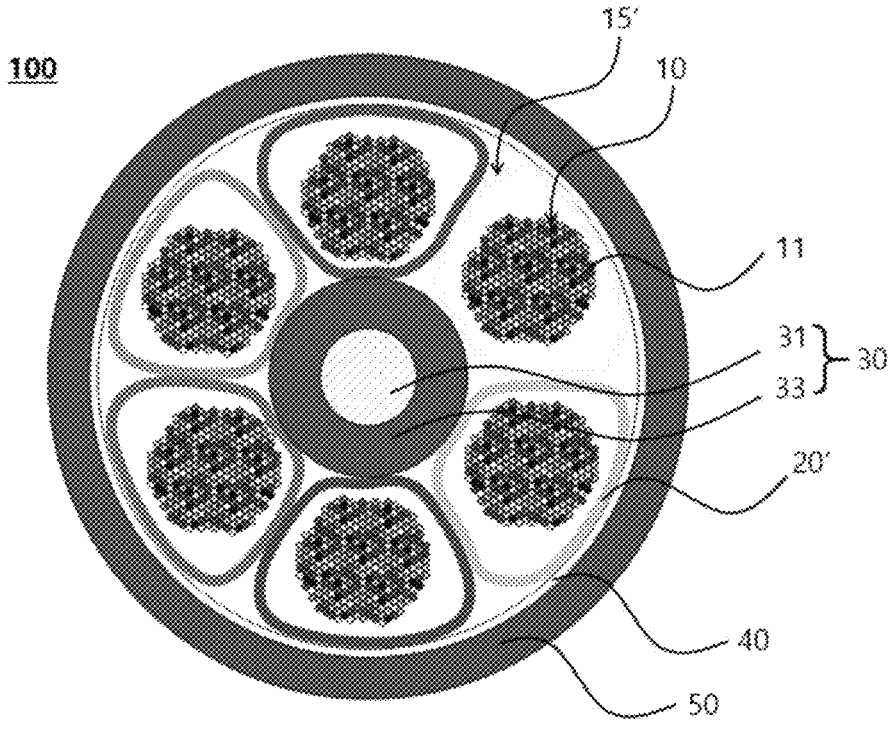
FIG. 2 is a cross-sectional view of another example of an optical cable with a tubular member accommodating a plurality of optical fibers therein.

Therefore, as shown in FIGS. 1 and 2, the present disclosure provides an optical cable including: a central tensile member; a plurality of optical units that include an optical fiber bundle formed by gathering a plurality of rollable optical fiber ribbons with a plurality of optical fibers and a plurality of tubular members; and are arranged around the central tensile member; and a cable jacket covering the tubular members of the plurality of optical units. A ratio ε of an EGL of the rollable optical fiber ribbons of the optical fiber bundle relative to the length of the tubular member of the optical cable satisfies a formula of $$0 \le \varepsilon \le \sqrt{\frac{2R}{2R - H}} - 1,$$

wherein R denotes a minimum bending radius R_min of the optical fibers, and H denotes a diameter based on a cross-sectional area of the optical cable with a spiral trajectory of a center point on the optical fiber bundle modeled as having a circular cross section (see FIG. 4).

As described above, an optical cable as shown in FIGS. 1 and 2, the central tensile member 30 may include a core 31 formed of a reinforced glass fiber and a coating layer 33 surrounding the core 31. As another concrete example, the central tensile member 30 can be one of, but not limited to, Kevlar aramid yarn, fiber glass epoxy rod, FRP (Fiber Reinforced Polyethylene), high strength fiber, steel strand, or steel wire, which has both strength and elasticity to a certain degree.

A manufacturing method of an optical cable of the present disclosure described above will be described below.

In the present disclosure, a manufacturing method of a multi-fiber optical cable includes forming an optical fiber bundle by gathering a plurality of rollable optical fiber ribbons (S100), extruding a tubular member to surround the optical fiber bundle by a first extrusion molding device (S200), forming an optical unit assembly by gathering tubular members by a gathering device and binding the tubular members by a binding member (S300), and forming a cable jacket to cover the optical unit assembly by a second extrusion molding device (S400).

And the gathering device gathers the plurality of tubular members while repeatedly twisting the plurality of tubular members around a central tensile member in a sz-direction.

In the extruding of the tubular member to surround the optical fiber bundle (S200), when an insertion rate of the optical fiber bundle is V1 and an extrusion rate of the tubular member is V2, Formula 8 below is satisfied.

$$1 \le \frac{V1}{V2} \le \sqrt{\frac{2R}{2R - H}} \qquad \text{Formula 8}$$

In the above formula, R may denote a minimum bending radius R-min of the optical fiber, and H (see FIG. 4) may denote a reference diameter of a cross-sectional area of an optical cable with a spiral trajectory of a center point on the optical fiber bundle modeled as having a round cross section.

As described above, an optical cable of the present disclosure may include a plurality of optical units as shown in FIGS. 1 and 2, and each of the optical units may be configured such that a length of an optical fiber bundle in a tubular member is equal to an EGL thereof.

To manufacture each optical unit, first, the forming the optical fiber bundle (S100) is performed to form an optical fiber bundle by gathering a plurality of optical fibers, e.g., rollable optical fiber ribbons, and the extruding of the tubular member (S200) may be performed to form the tubular member outside the optical fiber bundle.

In this case, the optical fiber bundle in the tubular member of the optical unit should be configured to have an EGL, i.e., the optical fiber bundle to be inserted into the tubular member should be longer than the tubular member. In the extruding of the tubular member (S200), the insertion rate V1 of the optical fiber bundle should be greater than or equal to the extrusion rate V2 of the tubular member, and thus, a relation of $$1 \le \frac{V1}{V2}$$

is established and a relation of $$\frac{L}{p} = \sqrt{\frac{2R}{2R - H}}$$

is established according to Formulae 4 and 6. In this case, when the optical fiber bundle having a length L is inserted into the tubular member having a length p for a time period Δt, a relation of $$\frac{L}{p} = \frac{V1 * \Delta t}{V2 * \Delta t}$$

is established. Therefore, in Formulae 4 and 6, the ratio ε of the EGL of the optical fiber bundle 10 relative to the length of the tubular member 20 may be converted into Formula 9 below that is a ratio of the lead-in rate V1 of the optical fiber bundle to the extrusion rate V2 of the tubular member optical fiber bundle.

$$\frac{V1}{V2} = \sqrt{\frac{2R}{2R - H}} \qquad \text{Formula 9}$$

As described above, in these relations, a bending radius of optical fibers is effective when the bending radius is equal to or less than the minimm bending radius R_min and thus Formula 9 should satisfy the relation of $$\frac{V1}{V2} \le \sqrt{\frac{2(R\_min)}{2(R\_min) - H}}.$$

Accordingly, Formula 8 above can be derived from the relation of $$1 \le \frac{V1}{V2} \text{ and } \frac{V1}{V2} \le \sqrt{\frac{2(R\_min)}{2(R\_min) - H}}.$$

In this case, according to the type of optical fibers of the rollable optical fiber ribbons or the optical fiber bundle, the minimum bending radius R_min is 65 mm when the optical fibers are G.652, is 50 mm when the optical fibers are G.657.A1, is 50 mm when the optical fibers are G.657.A2, and is 35 mm when the optical fibers are G.657.B3 as shown in Table 1 above.

While the present disclosure has been described above with respect to exemplary embodiments thereof, it would be understood by those of ordinary skilled in the art that various changes and modifications may be made without departing from the technical conception and scope of the present disclosure defined in the following claims. Thus, it is clear that all modifications are included in the technical scope of the present disclosure as long as they include the components as claimed in the claims of the present disclosure.

The invention claimed is:

1. An optical cable comprising:
a plurality of optical fibers; and
a tubular member configured to accommodate therein an optical fiber bundle formed by gathering the plurality of optical fibers,
wherein a length of each optical fiber of the plurality of optical fibers of the optical fiber bundle is greater than or equal to a length of the tubular member, and
a ratio (ε) of an excess group length of the optical fibers of the optical fiber bundle to the length of the tubular member of the optical cable satisfies the following formula:

$$\varepsilon \le \sqrt{\frac{2R}{2R - H}} - 1,$$

wherein R denotes a lossless bending radius of each optical fiber of the plurality of optical fibers, and
H denotes a diameter based on a cross-sectional area of the optical cable with a spiral trajectory of a center point on the optical fiber bundle modeled as having a circular cross-section.

2. The optical cable of claim 1, further comprising a jacket configured to cover the tubular member.

3. The optical cable of claim 1, wherein, when the optical fiber bundle includes a plurality of types of optical fibers, a lossless bending radius of the plurality of types of optical fibers is largest among lossless bending radii of the plurality of types of optical fibers.

4. The optical cable of claim 1, wherein the plurality of optical fibers of the optical fiber bundle comprise at least one rollable optical fiber ribbon.

5. The optical cable of claim 2, wherein two or more tubular members are provided.

6. The optical cable of claim 2, wherein the tubular member is one of a plurality of tubular members, the optical cable further comprising a central tensile member, an outer circumferential surface of which is surrounded by the plurality of tubular members in contact with the plurality of tubular members.

7. The optical cable of claim 6, further comprising a binding member configured to bind the plurality of tubular members,
wherein the binding member is provided between the plurality of tubular members and the jacket.

8. The optical cable of claim 1, wherein optical fibers of the plurality of optical fibers comprise at least one of G.652 optical fibers, G.657.A1 optical fibers, G.657.A2 optical fiber, or G.657.B3 optical fibers.

9. The optical cable of claim 8, wherein R is 40 millimeters (mm) when a type of the optical cable is G.652, is 30 mm when the type of the optical cable is G.657.A1, is 25 mm when the type of the optical cable is G.657.A2, and is 20 mm when the type of the optical cable is G.657.B3.

10. An optical cable comprising:
a central tensile member;
a plurality of optical fiber bundles formed by gathering a plurality of optical fibers;
a plurality of tubular members arranged around the central tensile member and accommodating the plurality of optical fiber bundles therein; and
a jacket covering the plurality of tubular members, wherein a ratio (ε) of an excess group length of rollable optical fiber ribbons of the plurality of optical fiber bundles to a length of the plurality of tubular members of the optical cable satisfies the following formula:

$$0 \le \varepsilon \le \sqrt{\frac{2R}{2R-H}} - 1,$$

wherein R denotes a lossless bending radius of the plurality of optical fibers, and H denotes a diameter based on a cross-sectional area of the optical cable with a spiral trajectory of a center point on the plurality of optical fiber bundles modeled as having a circular cross section.

11. The optical cable of claim 10, wherein optical fibers of the plurality of optical fibers comprise at least one of G.652 optical fibers, G.657.A1 optical fibers, G.657.A2 optical fiber, or G.657.B3 optical fibers.

12. The optical cable of claim 10, wherein the plurality of optical fibers of the plurality of optical fiber bundles comprise at least one rollable optical fiber ribbon.

13. The optical cable of claim 11, wherein R is 40 millimeters (mm) when a type of the optical cable is G.652, is 30 mm when the type of the optical cable is G.657.A1, is 25 mm when the type of the optical cable is G.657.A2, and is 20 mm when the type of the optical cable is G.657.B3.

14. A manufacturing method of a multi-fiber optical cable, comprising:

forming an optical fiber bundle by gathering a plurality of optical fibers;

forming a tubular member by a first extrusion molding device to surround the optical fiber bundle;

forming an optical unit assembly by gathering a plurality of tubular members by a gathering device while twisting the plurality of tubular members, and binding the plurality of tubular members by a binding member; and forming a jacket by a second extrusion molding device to cover the optical unit assembly, wherein, when forming the tubular member, an insertion rate of the optical fiber bundle is V1 and an extrusion rate of the tubular member is V2, the following formula is satisfied:

$$1 \le \frac{V1}{V2} \le \sqrt{\frac{2R}{2R-H}},$$

wherein R denotes a lossless bending radius of the plurality of optical fibers, and H denotes a diameter based on a cross-sectional area of the multi-fiber optical cable with a spiral trajectory of a center point on the optical fiber bundle modeled as having a circular cross section.

15. The manufacturing method of the multi-fiber optical cable of claim 14, wherein the plurality of optical fibers of the optical fiber bundle comprise at least one rollable optical fiber ribbon.

16. The manufacturing method of the multi-fiber optical cable of claim 14, wherein the gathering device gathers the plurality of tubular members while repeatedly twisting the plurality of tubular members around a central tensile wire in an sz-direction.

\*  \*  \*  \*  \*